Feb. 19, 1963 D. A. McCAULAY 3,078,322
HYDROGEN FLUORIDE ALKYLATION PROCESS
Filed March 8, 1961
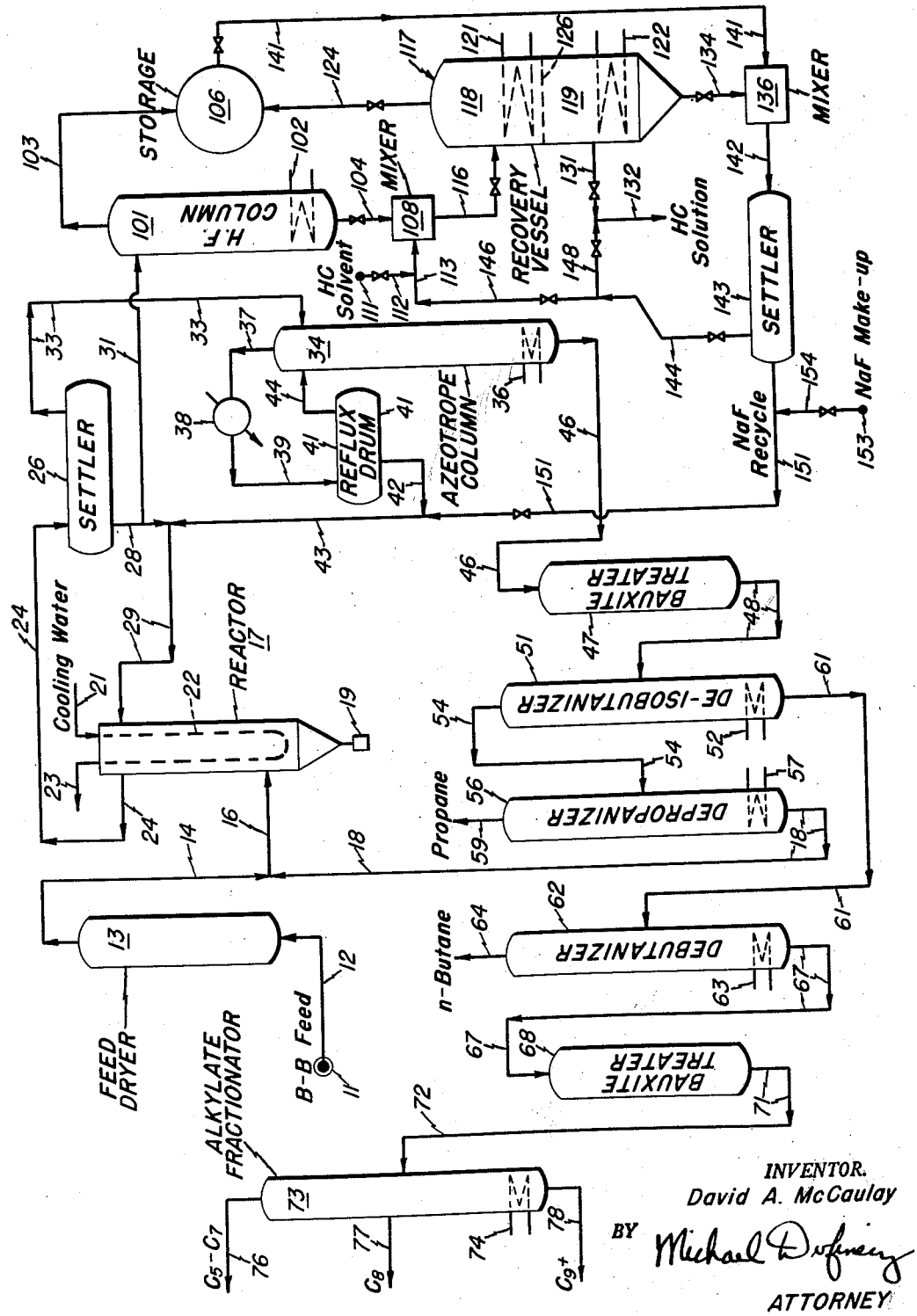
INVENTOR.
David A. McCaulay
BY Michael Dufresne
ATTORNEY 3,078,322
HYDROGEN FLUORIDE ALKYLATION PROCESS
David A. McCaulay, Homewood, Ill., assignor to Standard Oil Company, Chicago, Ill., a corporation of Indiana
Filed Mar. 8, 1961, Ser. No. 94,216
9 Claims. (Cl. 260—683.51)

This invention relates to the hydrogen fluoride catalyzed alkylation process reacting isobutane with propylene, butene, and/or pentene.

The octane race has reached the stage where the once upon a time high octane gasoline components are not any longer high enough in octane. Once alkylate from isobutane-butene reaction was used to provide the octane numbers needed to meet the demand. However, alkylate as now produced needs improvement. Alkylate is important to present day gasolines because of its low sensitivitivity i.e. small difference between the ASTM research and motor octane numbers.

The alkylation of the isobutane with propylene, butene, and/or pentene is practiced on a commercial scale with liquid hydrogen fluoride catalyst. Efforts to improve the effectiveness of this process have been carried on in the past. In general, these modified processes have attempted to improve the yield of alkylate hydrocarbons boiling in the gasoline range. One of the procedures for modifying the activities of liquid hydrogen fluoride as a catalyst for paraffin alkylation is set out in U.S. Patent No. 2,430,181 granted on November 4, 1947, on an application filed September 29, 1941. In this modification, alkali metal fluorides are dissolved in the liquid hydrogen fluoride; in the working example isobutane and normal butene are reacted at approximately 100° F. using as the catalyst 98% liquid hydrogen fluoride containing 11% by weight based on HF of potassium fluoride.

The invention herein comprises a particular continuous process for the alkylation of isobutane with at least one olefin containing 3–5 carbon atoms utilizing liquid hydrogen fluoride catalyst modified with alkali metal fluoride dissolved therein. Problems arise with the use of these solid alkali metal fluoride modifiers with respect to the recovery of the liquid hydrogen fluoride catalyst system for reuse in a continuous process, which problem are solved in the particular process described herein.

The invention is described in connection with the annexed figure which forms a part of this specification. It is to be understood that the process features set out are schematic in nature and many items of equipment have been omitted as these can be easily added by those skilled in the art.

The feed to the process of the invention comprises isobutane and at least one olefin containing 3–5 carbon atoms i.e. propylene, butene, and pentene. The feed may contain appreciable amounts of normal butane and pentane and/or propane; also other materials normally present in these low boiling hydrocarbons which do not deactivate the catalyst. In this illustration, the feed consists almost entirely of isobutane and a mixture of butenes derived from refinery operations. This B—B feed stream is passed from source 11 by way of line 12 into feed drier 13. It is necessary to control the water content of the B—B stream in order to avoid dilution of the HF catalyst. The feed drying operation may be any conventional procedure but in this instance the feed drier is a conventional bauxite operation. The dried feed is passed by way of line 14 and line 16 into reactor 17. Line 16 includes recycled isobutane introduced by way of line 18.

Regardless of the type of olefin charged, the mole ratio of isobutane to olefin is at least about 2. Preferably this ratio is higher and may be 100 and even more. The effective isobutane/olefin ratio within reactor 17 may be far in excess of 2 and may approach 1000 or more by multi-point olefin injection. In order to distinguish the overall isobutane/olefin ratio from the ratio actually present within the reactor, the overall ratio is normally designated as the external I/O. Thus herein the external I/O ratio is at least about 2 and typically is about 4–10.

Reactor 17 herein is shown as a vertical contacting vessel provided with an agitator (not shown) driven by motor 19. The alkylation reaction is exothermic and in order to control temperature within the reactor cooling water is passed by way of line 21 through heat exchanger 22 within reactor 17 and withdrawn by way of line 23. The reactor effluent comprising liquid HF catalyst, alkylate hydrocarbons, and unreacted hydrocarbons is withdrawn by way of line 24 and passed to settler 26.

The temperature maintained within reactor 17 is broadly on the order of 30° F.–130° F. In the process of the invention, it is preferred to operate at a temperature of about 60–80° F. It has been determined that using the catalyst hereinafter described that there is no significant advantage with respect to yield of gasoline range/alkylate hydrocarbon and octane number thereof by operating at temperatures outside the preferred range.

The alkylation reaction takes place with both the feed hydrocarbons and the catalyst in the liquid state. Sufficient pressure is maintained on reactor 17 to keep both the feed hydrocarbons and the hydrogen fluoride in the liquid state.

The volume ratio of catalyst in reactor 17 to overall feed charged by way of line 16 is at least about 0.6. More typically the volume ratio of catalyst to feed in reactor 17 is about 1–3. It is possible under some situations to want to and to operate with more than three volumes of catalyst per volume of feed, for example 10:1.

The liquid catalyst contains alkali metal fluoride. These solid alkali metal fluorides are very soluble in liquid hydrogen fluoride. At 75° F. it has been observed that approximately 40 parts by weight of sodium fluoride (NaF) are soluble per 100 parts by weight of liquid HF. By the alkali metal fluorides it is understood the fluorides of lithium, sodium, potassium, rubidium and cesium. It is preferred to use either sodium fluoride or potassium fluoride.

In paraffin alkylation using liquid HF catalyst in a recycle operation, there is a build-up of HF-soluble hydrocarbons. These HF-soluble hydrocarbons are commonly referred to as red oil or polymer. (In a typical commercial operation practiced at one refinery, it has been observed that substantially optimum yield and other benefits are obtained at a circulating HF catalyst system containing close to 2 parts by weight of red oil per 100 parts by weight of liquid HF present.) Red oil formation occurs even when alkali metal fluoride catalyst modifiers are present. The following usages of alkali metal fluoride are given on the basis that the liquid HF catalyst system will contain 1–2 parts by weight of red oil per 100 parts by weight of liquid HF. The greatest benefit of the presence of the alkali metal fluoride modifier will be obtained by changing the amounts given hereinafter by approximately one part by weight of alkali metal fluoride for each change in red oil content in parts by weight. For example, when the red oil content of the circulating liquid HF catalyst system is decreased by one part by weight then approximately the benefits hereinafter set forth will be obtained by increasing the amount of alkali metal fluoride present by one part by weight. However, it is to be understood that red oil has a bad effect on the yield structure of the alkylate hydrocarbons and it is usual to operate with a red oil content in the region of 1–3 weight percent and desirably less than 2-percent. (Percent herein means one part per 100 parts of liquid HF.)

In general, the liquid HF catalyst system contains dissolved alkali metal fluoride in an amount on the order of 1–5 moles per 100 moles of hydrogen fluoride present. In the case of sodium fluoride usage, the amount of sodium fluoride present is about 2–10 parts by weight per 100 parts by weight of hydrogen fluoride present; the preferred usage of sodium fluoride is about 2–6 parts by weight per 100 parts by weight of hydrogen fluoride present.

It is to be understood that the amount of alkali metal fluoride present given above represents a compromise between yield of octane ($C_8$) hydrocarbons and octane number thereof. With sodium fluoride as the modifier and a red oil free liquid HF catalyst, it has been determined that optimum benefits are obtained for octane number improvement at 3–12%; for heavy alkylate i.e. $C_9+$, of 3–14%; and of $C_7$ and lower material, 3–8%.

It is to be understood that the above figures are specifically directed to an alkylation reaction between isobutane and butenes, said butenes being in about the proportion normally encountered in refinery operation. In general, it is considered that this range of alkali metal fluoride usage will hold for reactions wherein the olefin is propylene or pentene.

It is also to be understood that the optimum usage of alkali metal fluoride promoter will vary somewhat with the particular olefin isomer; whereas the butene-1 and butene-2 isomers have well defined optimums, isobutylene tends to a plateau maximum. Butene-1 is benefited most with respect to octane number improvement. Both butene-1 and butene-2 show a range of alkali metal fluoride usage producing roughly constant octane number alkylate product. And then the octane number drops with further increase in the amount of alkali present. Isobutylene shows very little adverse effect with large amounts of alkali metal fluoride present. The yield of octane hydrocarbon and particularly trimethylpentanes shows a relatively rapid decline with increased alkali metal fluoride usage with both butene-1 and butene-2; butene-2 is much more responsive adversely with increasing usage of alkali metal fluoride. Also on the production of hydrocarbons having fewer than 8 carbon atoms i.e. $C_7-$ and hydrocarbons having more than 8 carbon atoms i.e. $C_9+$ the best results are obtained using alkali metal fluoride in the ranges set out above.

The invention is further illustrated with reference to the following description of the drawing:

The total reactor effluent is passed by way of line 24 into settler 26. Here the effluent separates into a lower liquid phase and an upper liquid hydrocarbon phase; the alkylate hydrocarbons are present in this upper phase. The liquid hydrocarbon phase contains dissolved HF and usually some occluded catalyst phase material. Liquid catalyst phase is withdrawn from settler 26 by way of line 28. Most of this liquid catalyst phase is recycled to reactor 17 by way of line 29. A portion of the liquid catalyst phase is sent to HF regeneration by way of line 31.

The upper liquid hydrocarbon phase is withdrawn from settler 26 by way of line 33 and is passed into column 34. In column 34 the HF content of the hydrocarbon phase is distillatively removed. Column 34 is provided with a reboiler 36. In column 34 an overhead vapor stream comprising an azeotrope of HF and hydrocarbon is removed by way of line 37, condenser 38 and line 39 to reflux drum 41. In reflux drum 41 the HF and the hydrocarbons separate into two layers. A bottom layer of liquid HF is removed by way of line 42 and may be passed by way of lines 43 and 29 into reactor 17. Hydrocarbons are returned from column 41 by way of line 44 into an upper part of column 34 to act as reflux.

A bottom stream is withdrawn from column 34 by way of line 46. This stream contains a small amount of chemically bound fluorine. For product quality it is necessary to remove this fluorine and this is done by passing the hydrocarbon stream from line 46 through a bed of bauxite contained in treater 47. Bauxite treater 47 is entirely conventional and is not further described herein. A hydrocarbon stream virtually free from fluorine is withdrawn from treater 47 by way of line 48 and is passed into de-isobutanizer 51; this tower 51 is provided with reboiler 52. A stream comprising propane and lighter hydrocarbons and isobutane is taken overhead from tower 51 and passed by way of line 54 into de-propanizer 56. Tower 56 is provided with reboiler 57. Propane and lighter hydrocarbons are withdrawn overhead by way of line 59 and passed to storage or further treatment, not shown. A bottom stream consisting of isobutane is withdrawn from tower 56 and passed by way of line 18 and line 16 into reactor 17.

A bottoms stream is withdrawn from de-isobutanizer 51 and is passed by way of line 61 into de-butanizer tower 62. Tower 62 is provided with reboiler 63. Normal butane is withdrawn from tower 62 by way of overhead line 64 and sent to storage, not shown.

Alkylate product is withdrawn from tower 62 and passed by way of line 67 into bauxite treater 68. Bauxite treater 68 functions in conventional manner of treater 47 and removes essentially all of the chemically bound fluorine remaining in the hydrocarbon. The total alkylate product is passed from treater 68 by way of line 71 into a fractionator 73. Fractionator 73 is provided with a reboiler 74. It is to be understood that many modifications of cutting up the alkylate product are known. Herein the alkylate is simply cut into a $C_5-C_7$ fraction shown as being removed by way of line 76, a $C_8$ fraction shown as being removed by line 77 and a $C_9+$ fraction being removed by way of line 78.

Liquid catalyst phase from line 41 is passed into a HF column 101 provided with a heater 102. In this embodiment column 101 is operated to remove sufficient HF overhead by way of line 103 to obtain a concentrated HF solution of alkali metal fluoride. In this instance the concentrate removed from column 101 by way of valved line 104 contains about forty parts by weight of sodium fluoride per 100 parts of HF. The HF tower overhead is passed by way of line 103 into storage drum 106.

The concentrate from line 104 is passed into mixer 108 where it is intermingled with a liquid hydrocarbon. The "HC solvent" is passed from source 111 by way of valved line 112 and line 113 into mixer 108. A stream of the distillation residue from column 101 and solvent hydrocarbon from line 113 is withdrawn from mixer 108 and passed by way of valved line 116 into vessel 117.

The HC solvent boils above the boiling point of hydrogen fluoride in order to permit complete removal of HF from the red oil and sodium fluoride present in the stream from line 104. This solvent is also inert to the action of liquid HF. Heavy alkylate hydrocarbons are particularly suitable material for this use. Sufficient HC solvent is used to dissolve red oil present in the liquid catalyst phase and to wash essentially clean the surface of solid sodium fluoride formed by complete removal of HF overhead in vessel 117. The amount of HC solvent used is dependent somewhat on the temperature of operation but mostly on how completely free from red oil the solid sodium fluoride is to be. In general the amount of HC solvent will fall in the range of 25–300 volumes per 100 volumes of HF passed to column 101.

It is to be understood that the alkali metal fluoride recovered from the HF solution is at ordinary temperatures mostly in the form of alkali metal hydrogen fluoride rather than the simple alkali metal fluoride. However, for convenience herein this is always referred to as simply alkali metal fluoride such as sodium fluoride.

Recovery vessel 117 is provided with an upper zone 118 and a lower zone 119. Each of these zones being provided with an internal heater 121 and 122 respectively. In zone 118 most of the HF introduced through line 116 is vaporized overhead and passed by way of valved line 124 into storage drum 106. The slurry of solid sodium fluoride in liquid hydrocarbon consisting of hydrocarbon solvent and dissolved red oil flows through a perforated partition 126 into lower zone 119. In lower zone 119 the remaining HF is distilled and passed into zone 118. This zone 119 also is adapted to permit de-cantation of hydrocarbon solvent from a thickened slurry of solid sodium fluoride. Hydrocarbon solution consisting of solvent and dissolved red oil is withdrawn by way of valved line 131 and passed from the system by way of line 132.

The thickened slurry is withdrawn from lower zone 113 by way of valved line 134 and passed into mixer 136. Liquid HF from storage drum 106 is passed by way of valved line 141 into mixer 136 where it dissolves the sodium fluoride. The material from mixer 136 is passed by way of line 142 into settler 143. In settler 143 the remaining hydrocarbon solution separates and is withdrawn by way of valved line 144. This solution can be reused if desired by passing through valved line 146 and line 113 into mixer 108. Usually the hydrocarbon solution from line 144 is discarded from the system by way of valved line 148 and line 132.

The liquid HF solution of sodium fluoride is withdrawn from settler 143 and recycled by way of valved line 151 and lines 43 and 29 to reactor 17. Some loss of sodium fluoride does occur and make up sodium fluoride is introduced into the system from source 153 by way of valved line 154.

It is to be understood that other procedures for recovering red oil free sodium fluoride from the liquid catalyst phase can be readily devised. For example, all of the HF can be removed from the liquid catalyst phase of line 31. The distillation residue of solid sodium fluoride and red oil can be washed with hydrocarbon solvent to remove the red oil and the hydrocarbon solution de-canted from the washed solids or filtered away therefrom. Then the solid sodium fluoride can be dissolved in liquid HF and recycled to the reactor 17. In another example, the hydrocarbon solvent can be introduced into the liquid catalyst phase prior to the removal of any HF overhead. Also procedures are available whereby the recovered sodium fluoride can be introduced as a solid into the circulating liquid catalyst phase of line 29; or even directly into reactor 17.

It has been determined that the instant process that is described above provides maximum yields of octane hydrocarbon alkylate, based on olefin charged, and isomeric distribution affording octane numbers approaching 98 ASTM research clear. The foregoing coupled with a reasonably simple recovery operation of the liquid HF catalyst system provides a process suitable for commercial use.

Thus having described the invention what is claimed is:

1. A hydrogen fluoride catalyzed alkylation process which comprises (1) contacting, in the liquid state, a hydrocarbon feed and a catalyst, at a temperature on the order of 30°–130° F., for a time to convert substantially all of the olefins in said feed to alkylate hydrocarbons, at a volume ratio of catalyst to feed of at least about 0.6, said feed comprising isobutane and at least one olefin containing 3–5 carbon atoms in a molar ratio of isobutane to olefin of at least about 2, said catalyst consisting essentially of liquid hydrogen fluoride and dissolved alkali metal fluoride, in an amount on the order of 1–5 moles of said alkali metal fluoride per 100 moles of hydrogen fluoride present, (2) separating a liquid catalyst phase from a liquid hydrocarbon phase containing alkylate hydrocarbons, said hydrocarbon phase containing some catalyst phase material, (3) separating alkylate hydrocarbons from said hydrocarbon phase, (4) distillatively removing essentially all of the hydrogen fluoride from said catalyst phase, (5) contacting the distillation residue including alkali metal fluoride from said step 4 with a liquid hydrocarbon having a boiling point above that of hydrogen fluoride to dissolve the hydrocarbons present in said residue, (6) separating hydrocarbon solution obtained in said step 5 from solid alkali metal fluoride and (7) recycling said alkali metal fluoride to said step 1.

2. The process of claim 1 wherein said alkali metal fluoride is selected from the class consisting of sodium fluoride and potassium fluoride.

3. The process of claim 1 wherein said alkali metal fluoride is sodium fluoride and said amount is about 2–10 parts by weight of said sodium fluoride per 100 parts by weight of hydrogen fluoride present.

4. The process of claim 3 wherein said amount is about 2–6 parts by weight of said sodium fluoride per 100 parts by weight of hydrogen fluoride present.

5. The process of claim 1 wherein said temperature in step 1 is about 60–80° F.

6. The process of claim 1 wherein said catalyst/feed ratio is about 1–3.

7. The process of claim 1 wherein said isobutane to olefin ratio is about 2–100.

8. A hydrogen fluoride catalyzed alkylation process which comprises (A) contacting, in the liquid state, a hydrocarbon feed and a catalyst, at a temperature on the order of 30°–130° F., for a time to convert substantially all of the olefins in said feed to alkylate hydrocarbons, at a volume ratio of catalyst to feed of at least about 0.6, said feed comprising isobutane and at least one olefin containing 3–5 carbon atoms in a molar ratio of isobutane to olefin of at least about 2, said catalyst consisting essentially of liquid hydrogen fluoride, HF-soluble hydrocarbon and dissolved alkali metal fluoride, in an amount on the order of 1–5 moles of said alkali metal fluoride per 100 moles of hydrogen fluoride present, (B) separating a liquid catalyst phase from a liquid hydrocarbon phase containing alkylate hydrocarbons, said hydrocarbon phase containing some catalyst phase material, (C) separating alkylate hydrocarbons from said hydrocarbon phase, (D) distillatively removing hydrogen fluoride from said catalyst phase to obtain a concentrated HF solution of alkali metal fluoride, (E) distillatively removing essentially all of the HF from the concentrate of step D, in the presence of an alkylate hydrocarbon boiling above HF to obtain a mixture of solid alkali metal fluoride and a solution of said HF soluble hydrocarbons in said alkylate hydrocarbon, (F) separating hydrocarbon solution obtained in said step E from solid alkali metal fluoride, (G) dissolving said solid alkali metal fluoride from step F in liquid hydrogen fluoride, and (H) cycling said alkali metal fluoride-HF solution to said step A.

9. A hydrogen fluoride catalyzed alkylation process which comprises (A) contacting, in the liquid state, a hydrocarbon feed and a catalyst, at a temperature on the order of 60°–80° F., for a time to convert substantially all the olefins in said feed to alkylate hydrocarbons, at a volume ratio of catalyst to feed of about 1–3, said feed comprising isobutane and butene in a ratio of isobutane to butene of at about 2–100, said catalyst consisting essentially of liquid hydrogen fluoride, HF-soluble hydrocarbon and dissolved sodium fluoride, in an amount on the order of 2–6 parts by weight of said sodium fluoride per 100 parts by weight of hydrogen fluoride present, (B) separating a liquid catalyst phase from a liquid hydrocarbon phase containing alkylate hydrocarbons, said hydrocarbon phase containing some catalyst phase material, (C) separating alkylate hydrocarbons from said hydrocarbon phase, (D) distillatively removing hydrogen fluoride from said catalyst phase to obtain a concentrated HF solution of sodium fluoride, (E) distillatively removing essentially all of the HF from the concentrate of step D, in the presence of an alkylate hydrocarbon boiling above HF to obtain a mixture of solid sodium fluoride and a solution of said HF soluble hydrocarbons in said alkylate hydrocarbon, (F) separating a hydrocarbon solution obtained in said step E from solid sodium fluoride, (G) dissolving said solid sodium fluoride from step F in liquid hydrogen fluoride, and (H) cycling said sodium fluoride-HF solution to said step A.

References Cited in the file of this patent
UNITED STATES PATENTS

| | | |
|---|---|---|
| 2,416,000 | Frey | Feb. 18, 1947 |
| 2,459,775 | Passino | Jan. 18, 1949 |